(12) United States Patent
Paradiso et al.

(10) Patent No.: US 6,404,340 B1
(45) Date of Patent: Jun. 11, 2002

(54) MULTIPLE-AXIS TRACKING OF PASSIVE RESONANT STRUCTURES

(75) Inventors: Joseph A. Paradiso, Medford; Kai-Yuh Hsiao, Cambridge, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/596,618

(22) Filed: Jun. 19, 2000

(51) Int. Cl.$^7$ ............................................... G08B 13/14
(52) U.S. Cl. .................. 340/572.5; 235/449; 340/572.7
(58) Field of Search .......................... 340/572.4, 572.5, 340/572.7, 551; 343/741, 742, 866, 867; 235/449

(56) References Cited

U.S. PATENT DOCUMENTS

| | | | |
|---|---|---|---|
| 4,498,076 A | 2/1985 | Lichtblau | 340/572.3 |
| 5,175,419 A | * 12/1992 | Yamashita | 235/449 |
| 5,258,766 A | * 11/1993 | Murdoch | 343/742 |
| 5,466,896 A | 11/1995 | Murakami et al. | 178/19.03 X |
| 5,815,091 A | 9/1998 | Dames et al. | 340/870.34 |
| 6,144,300 A | * 11/2000 | Dames | 340/572.4 X |

FOREIGN PATENT DOCUMENTS

JP  200 452  * 7/1998

OTHER PUBLICATIONS

"Musical Trinkets: New Pieces to Play," Proposal etech_89 for the SIGGRAPH 200 Emerging Technologies exhibition, SIGGRAPH, 2000.

Paradiso et al., "Swept-Frequency, Magnetically-Coupled Resonant Tags for Reastime, Continuous, Multiparameter Control," Human Factors in Computing Systems: CHI99 Extended Abstracts, Apr. 1999, pp. 212–213.

Hsiao et al., "A New Continuous Mulitmodal Musical Controller Using Wireless Magnetic Tags," International Computer Music Conference (ICMC), Oct. 1999, pp. 1–4.

* cited by examiner

*Primary Examiner*—Thomas J. Mullen, Jr.
(74) *Attorney, Agent, or Firm*—Testa, Hurwitz & Thibeault LLP

(57) ABSTRACT

A preferred reader circuit for energizing the coils and detecting loading variations is shown in FIGS. 3A and 3B. It was designed for tabletop operation at relatively low frequencies; the amplitudes, frequencies, and time constraints listed below can be shifted as desired for other applications. The depicted schematic includes driver circuitry for three coils, it being understood that further drivers can be added as indicated in the figure. Each driver circuit includes an inductive bridge wherein a search coil $305_1$, $305_2$, $305_3$ is balanced against a series of reference inductors $307_1$, $307_2$, $307_3$; $309_1$, $309_2$, $309_3$; and $331_1$, $311_2$, $311_3$ (the latter being variable to trim residuals in the search coil's inductance). A representative pair of search coils $305_1$, $305_2$ are identically wound and driven together, and the sensing volume between them is once again indicated at 200. Coil $305_3$ may be one of another coil pair, or may instead be a non-aligned search coil used to resolve orientation-related ambiguities with respect to coils $305_1$, $305_2$.

34 Claims, 4 Drawing Sheets

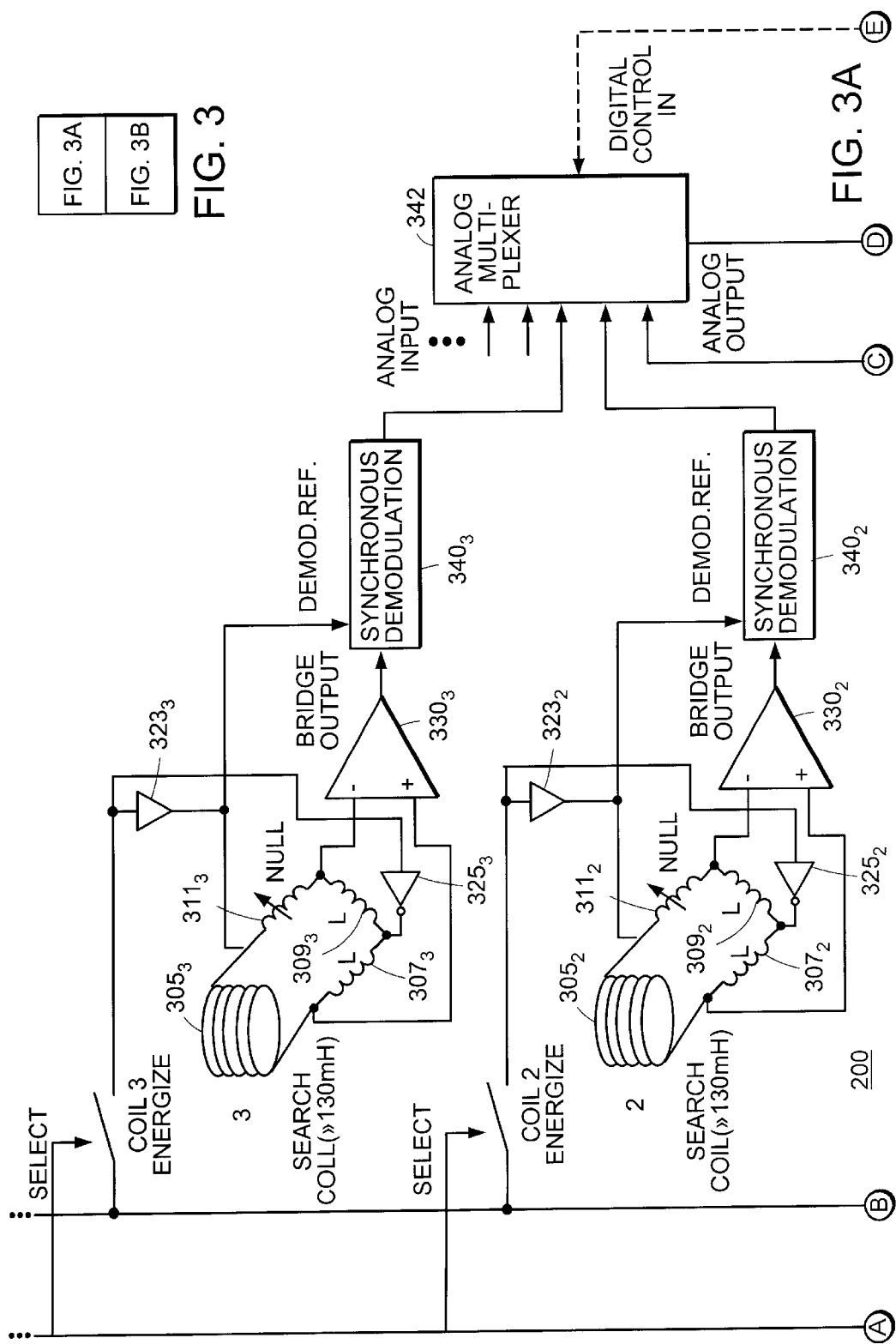

MULTIPLE-AXIS TRACKING OF PASSIVE RESONANT STRUCTURES

FIELD OF THE INVENTION

The present invention relates to magnetically coupled resonant structures, and in particular to tracking the positions and/or orientations of such structures.

BACKGROUND OF THE INVENTION

Radio frequency identification (RFID) devices have been employed for some time to remotely sense parameters of interest in people or objects. An RFID device or "tag" receives a wireless signal from an externally located "reader," which determines the identity (or other parameter of interest) of the item based on the response of the RFID device to the transmitted signal.

For example, the tag may contain an inductor and capacitor arranged in a parallel LC configuration so as to exhibit a characteristic resonant frequency. In this case, the transmitted signal may be a time-varying magnetic field produced by a "search" coil. This interrogation signal is pulsed at specific frequencies or swept through a range of frequencies and interacts with proximately located RFID tags. A tag is detected when the frequency of the interrogation field reaches the resonant frequency of the LC tag. Detection may take place in either of two ways: by using a separate receiving coil to measure the signal from the search coil, which will change at the tag's resonant frequency because of perturbations to the magnetic coupling; or by measuring the loading on the search coil, which will increase at this frequency as the tag extracts energy from the search coil's field.

While such systems are well-suited to detection and identification (based on the resonant frequency) of magnetically coupled tags, localizing the position of a detected tag is much more difficult: the magnitude of the detected signal depends not only on the tag's distance from the coil, but also on its orientation and position with respect to the coil. This is because of the shape of the field; the coupling is a function of the projection of the local magnetic field vector onto the tag's magnetic axis. The magnetic field of a coil is essentially toroidal, extending from one end of the coil and looping around to the other end in a radially symmetric fashion. As a result, the field is substantially uniform and directed along the axis of the coil only within the coil and in close proximity to its (axial) ends. Outside this region, the interaction between the tag and the field will be strongly dependent on tag orientation and position with respect to the field curvature.

DESCRIPTION OF THE INVENTION

Brief Summary of the Invention

In accordance with the present invention, a structure capable of magnetic coupling is tracked using one or more pairs of coils oriented such that, when the coils are energized, a substantially uniform magnetic field is created in a region between the coils. The field magnetically couples into any appropriately aligned structures located in the region between the coils. A value for a signal parameter indicative of the coupling is obtained for each coil; for example, that parameter may be the degree of loading on the coil driver. From the signal-parameter values, the position of the structure may be deduced. Each pair of coils provides position information along their common axis. By arranging multiple pairs of coils in orthogonal relation to each other, multiple-axis position information can be obtained. If six such measurements are taken (e.g., search-coil loading for each coil of three orthogonal pairs), the three translational positions and three absolute rotational inclinations ($|\alpha|$, $|\beta|$, $|\gamma|$) can be determined.

If the tag's magnetic axis is exactly orthogonal to the magnetic field axis generated by a pair of search coils, however, it will not couple so as to facilitate detection by either search coil. Full tracking can still be achieved, however, in any of various ways:

a) Constraining the inclination range of the tag such that it never becomes orthogonal to the search coil fields.

b) Using a plurality of non-aligned magnetic resonance elements, such as an aggregate of three tags in an orthogonal triad, for example.

c) Coupling magnetic flux from all three axes into a single resonant structure or circuit.

d) Adding additional search coils to span intermediate axes.

e) Driving non-aligned search coils to produce off-axis magnetic fields that project between the orthogonal axes to reduce ambiguities.

f) Using a single- or double-axis tag in conjunction with a tracking filter or algorithm that interpolates the tag position from the point at which a coordinate disappears (e.g., the tag orientation becomes orthogonal) and reappears again.

The invention is amenable to a wide range of applications. An LC resonance tag may be made small, lightweight, and low in cost; these characteristics, in combination with non-reliance on battery power, enable virtually any object to be "tagged" and to thereby serve as an interface device. An LC tag or combination of them may, for example, be worn on a finger or hand placed within the sensing volume 200 as part of an entertainment device such as a game, a virtual-reality environment, or a music synthesizer, with the detected (and frequently updated) three-dimensional position of the tag used as input. Three-dimensional tracking can also be useful in medical contexts, e.g., to follow the position of a tagged physical location during a procedure. For example, radiologists frequently must irradiate a volumetric region larger than a tumor under treatment in order to accommodate patient breathing or other movement. This results in otherwise unnecessary damage to healthy tissue. In accordance with the present invention, a small tag may be surgically associated with the tumor and its location monitored in three dimensions, thereby facilitating automatic steering of the treatment beam to follow the tumor as it moves. The system can detect and track multiple tags simultaneously, assuming that their resonant frequencies do not overlap.

BRIEF DESCRIPTION OF THE DRAWINGS

The foregoing discussion will be understood more readily from the following detailed description of the invention, when taken in conjunction with the accompanying drawings, in which:

FIGS. 3A and 3B schematically illustrate a useful drive circuit for the invention.

DETAILED DESCRIPTION OF THE PREFERRED EMBODIMENTS

Two coils spaced apart by an appropriate distance can produce a spatially uniform magnetic field in the region between them. For example, as shown in FIG. 1A, a Helmholtz pair 100 consists of two coils 105$_1$, 105$_2$, each of radius a and separated by the same distance a along the z axis. With z=0 defined between coils 105$_1$, 105$_2$, the center of coil 105$_1$ is located at $z_1=-a/2$ and the center of coil 105$_2$ is located at $z_2=a/2$. The total field between the Helmholtz coils 105$_1$, 105$_2$ is the sum of the individual fields $B(z_1)+B(z_2)$.

Figure 1B:
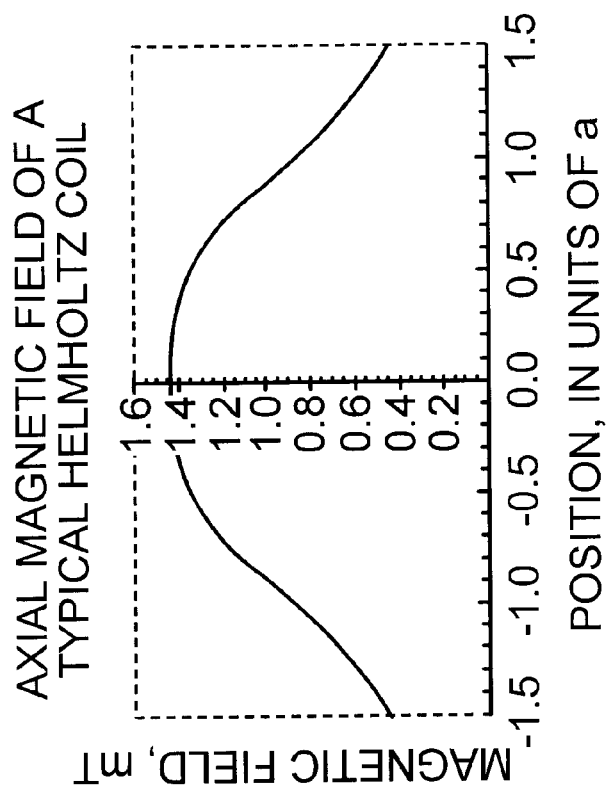
FIGS. 1A and 1B show the configuration and behavior of a Helmholtz coil pair.
Figure 1A:
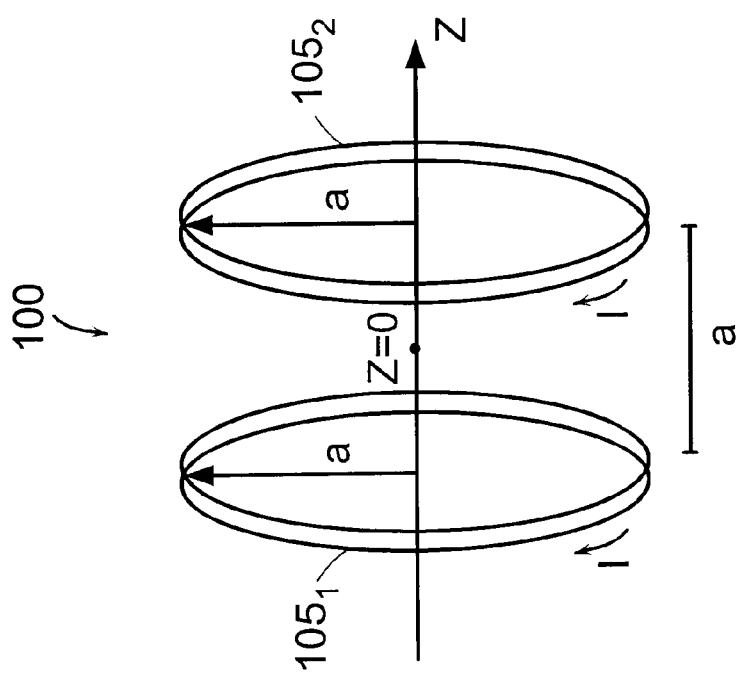

As shown in FIG. 1B, the magnitude of the axial field is substantially uniform within the region $-a/2 \leq z \leq a/2$, and falls off gradually beyond this region. If the coils are spaced further apart, the field will not be perfectly uniform throughout the entire intervening region between the coils, although it will be uniform through a central portion of this region (and progressively distort with increasing radius and as the coils are moved further apart).

Figure 2:
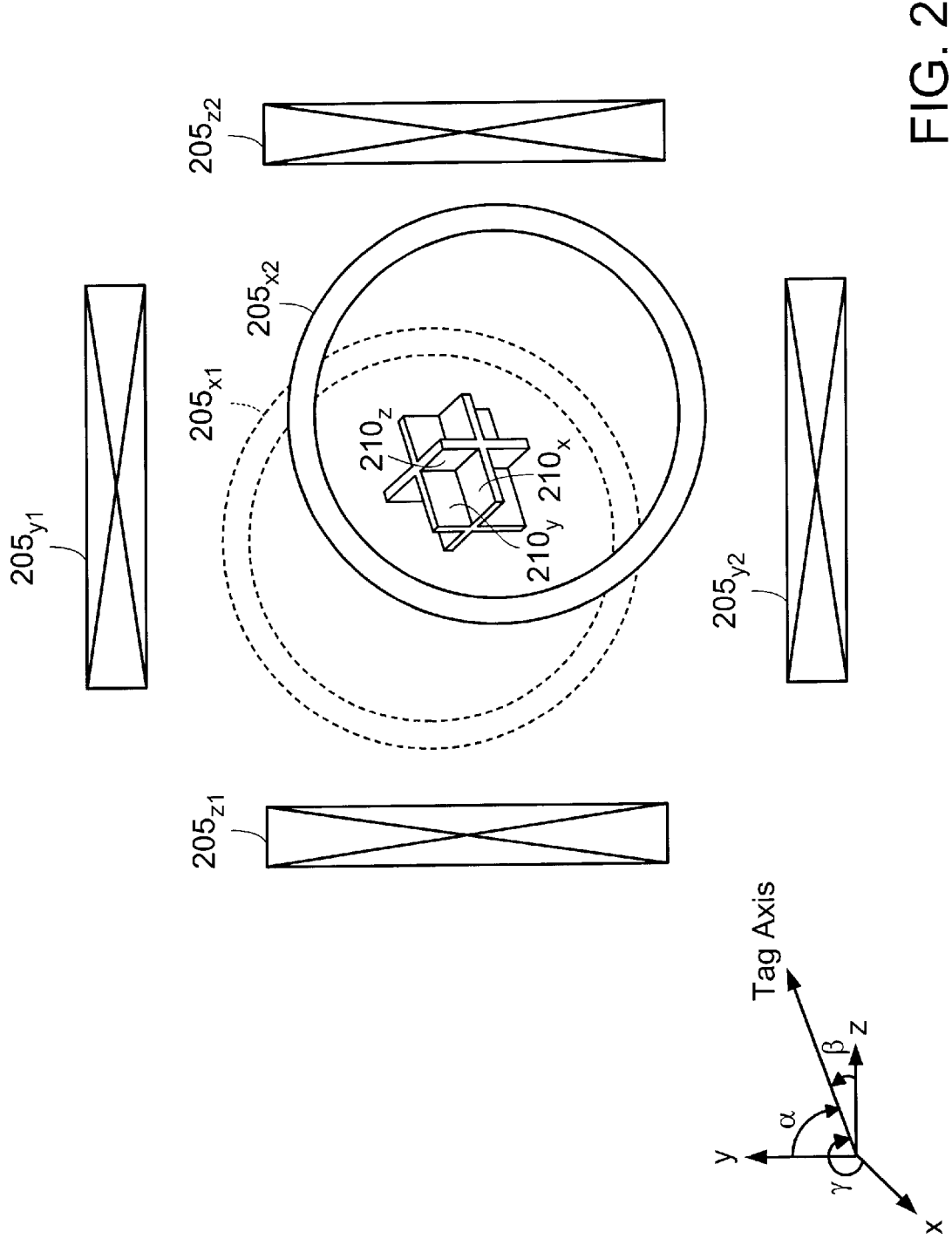
FIG. 2 schematically illustrates a six-coil embodiment of the present invention, which is capable of localizing position in three dimensions.

FIG. 2 illustrates the approach of the present invention. A tracking volume 200 is defined by three pairs of coils—one pair 205$_{z1}$, 205$_{z2}$ along the z axis; a second pair 205$_{y1}$, 205$_{y2}$ along the y axis; and a third pair 205$_{x1}$, 205$_{x2}$ along the x axis (with coils 205$_{x1}$ and 205$_{x2}$ offset, and coil 205$_{x1}$, shown in dashed lines, to indicate depth). In general all coils are identical in size and number of windings. The spacing between opposed coils may be equal to a coil radius in accordance with the classic Helmholtz arrangement shown in FIG. 1A. This configuration, however, results in spatial conflict between orthogonal coils, and requires an arrangement that permits the windings of these coils to cross. Alternatively, each pair of opposed coils may be spaced apart by a distance equal to the coil diameter rather than the coil radius. Again, although the magnetic field will not be completely uniform along the common axis between coils spaced this far apart, it will be substantially (e.g., >95%) uniform throughout most of the intervening region, and most nonlinear residuals can be mathematically calibrated out of the field measurements. In still other approaches, the coils may be spaced apart by a distance intermediate between the coil radius and diameter, or by a distance greater than a diameter. The coils can be made quite thin (e.g., approaching a wireframe), allowing for easy insertion and manipulation of objects or a patient's limb or torso within the volume 200.

The coils of an opposed pair are energized by identical currents, so that each produces a magnetic field directed toward the other coil (e.g., the opposite poles are aligned). In a preferred mode of operation, both coils are simultaneously driven by an oscillator that sweeps through a range of frequencies. A magnetic resonance structure disposed between the coils will transport maximum energy from the coils when the resonant frequency is reached; and as a result, the loading on the oscillator circuit will also be highest at this point. Assuming a constant magnetic field, the relative position P of such a structure between the two coils is a linear function of the two observed loading levels, $L_1$ and $L_2$, as follows:

$$P = kf(L), \text{ where } f(L) = \frac{L_2 - L_1}{L_2 + L_1}$$

and in which k is a constant and the sign of f(L) indicates the coil to which the structure is closest. Likewise, the absolute inclination $|\theta|$ of the structure relative to the magnetic field axis can be expressed as:

$$|\theta| = g(L), \text{ where } g(L) = \cos^{-1}\left(\frac{L_1 + L_2}{L_{\max}}\right)$$

in which $L_{max}$ is the maximum of $L_1+L_2$ when the tag is perfectly aligned with the field vector. These relationships are exact where the field is uniform, so that the simple linear function of the observed loading levels accurately characterizes position. To counter warping from field inhomogeneities near the coils, P may be modeled as a higher-order function of f(L), modeled using more terms in a linear least-squares fit, or modeled using a nonlinear fit procedure (e.g., radial basis functions, cluster-weighted modeling, or recursive estimation).

A considerable advantage to this approach is independence from structure orientation (apart from the case in which the coil is perfectly aligned with the field axis and $L_1+L_2$ goes to 0, precluding measurement). That is, even if the magnetically coupled structure is asymmetrical in shape, so long as a signal is detected, the derived position will be independent of its orientation between the coils, since both signals are equally affected by this orientation and the effect therefore cancels out. Full tracking can still be achieved, however, using a plurality of non-aligned magnetic resonance elements, such as an aggregate of three tags 210$_x$, 210$_y$, 210$_z$ in an orthogonal triad, for example.

The resonance structure detected by the coils may exhibit magnetically coupled electrical resonance (e.g., in the form of an LC circuit) or mechanical resonance (e.g., by means of a magnetostrictor strip).

Figure 3B:
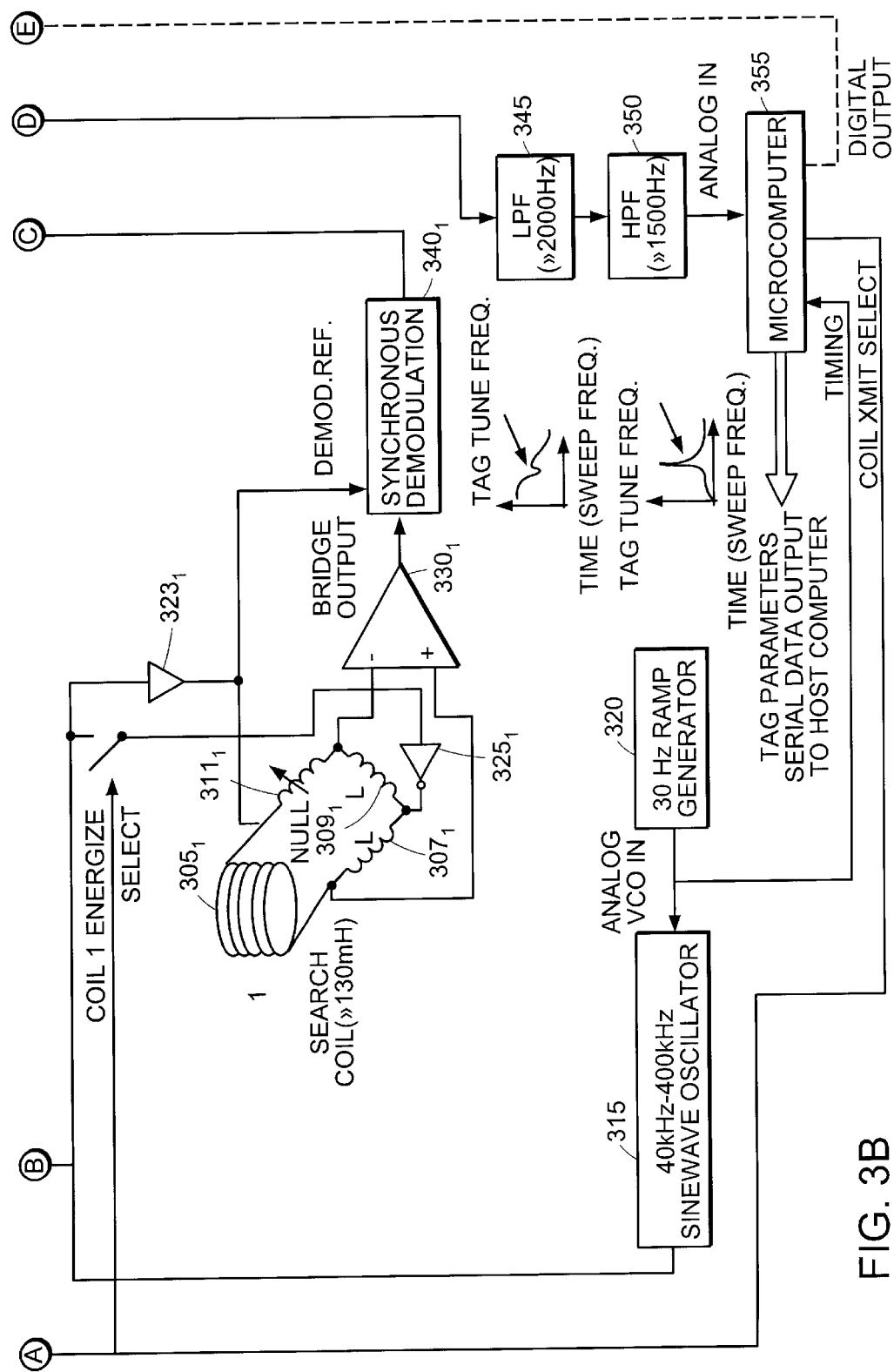

A preferred reader circuit for energizing the coils and detecting loading variations is shown in FIG. 3. It was designed for tabletop operation at relatively low frequencies; the amplitudes, frequencies, and time constraints listed below can be shifted as desired for other applications. The depicted schematic includes driver circuitry for three coils, it being understood that further drivers can be added as indicated in the figure. Each driver circuit includes an inductive bridge wherein a search coil 305$_1$, 305$_2$, 305$_3$ is balanced against a series of reference inductors 307$_1$, 307$_2$, 307$_3$; 309$_1$, 309$_2$, 309$_3$; and 311$_1$, 311$_2$, 311$_3$ (the latter being variable to trim residuals in the search coil's inductance). A representative pair of search coils 305$_1$, 305$_2$ are identically wound and driven together, and the sensing volume between them is once again indicated at 200. Coil 305$_3$ may be one of another coil pair, or may instead be a non-aligned search coil used to resolve orientation-related ambiguities with respect to coils 305$_1$, 305$_2$.

The bridge excitation source is a 20-volt variable sinusoidal oscillator 315, which is driven through its output range by a 30 Hz ramp generator 320. As a result, oscillator 315 sweeps from 40 kHz to 400 kHz at a repetition rate of 30 Hz. The oscillator output is fed to the search coils 305$_1$, 305$_2$, 305$_3$ through an amplifier 323$_1$, 323$_2$, 323$_3$, and to the two fixed reference inductors 307$_1$, 307$_2$, 307$_3$ and 309$_1$, 309$_2$, 309$_3$ through an inverting amplifier 325$_1$, 325$_2$, 325$_3$. The differential bridge imbalance is fed through an operational amplifier 330$_1$, 330$_2$, 330$_3$ to a synchronous demodulator 340$_1$, 340$_2$, 340$_3$ that receives, as a reference signal, the amplified oscillator signal from amplifier 323$_1$, 323$_2$, 323$_3$ and shifts the detected bridge signals down to baseband. The demodulated signal is fed through an analog multiplexer 342 to a low-pass filter 345 (with a breakpoint at about 2 kHz) in order to attenuate noise background, and thereafter to a high-pass filter 350 (with a breakpoint at about 1.5 kHz) to enhance abrupt changes in the bridges' null that occur when a tag's resonant frequency is encountered (and current is drawn by the search coils). The entire sweep operation is monitored by a microcomputer 355 (such as a PIC 16C73), which registers the center frequency, width, and the integrated height of each determined peak. The center frequency can be used to discriminate among different tags each having a different resonant frequency, while the integrated height, representing the coupling strength, is used to compute position and/or angle. In terms of discrimination, the number of unique tag identifiers is limited by the swept frequency range and the width (Q) of the resonances.

Our multiple-coil embodiment feeds the excitation of one oscillator circuit to the drivers of both coils, ensuring that they are driven in phase and generating the uniform field. Although one could share more components by moving the location of the multiplexer or using relays, each coil in our current embodiment has its own driver, bridge, and demodulator-filter circuits. By means of analog multiplexer 342, a full set of six coils can be successively driven and digitized using one swept oscillator source.

Microcomputer 355 may be configured to perform the position computation described above and provide, as an output, the computed position; the speed with which this can be accomplished determines the maximum frequency of ramp generator 320—i.e., the fastest feasible sampling rate. Likewise, the sweep can be also generated by the microcomputer, and the bridge excitation generated by the microcomputer, a direct digital synthesizer (DDS) or, as in the current embodiment, a voltage-controlled oscillator (VCO).

It should be noted that although loading measurements are preferred for their simplicity, other measurement modes are also possible. For example, each coil of a pair can be employed alternately as a sending and receiving coil; that is, a first coil of the pair transmits a sweep signal that the second coil receives, and then the second coil transmits a sweep signal that the first coil receives. In this approach, circuitry associated with the receiving coil (which, like transmission circuitry, is switchable between coils) detects the drop in signal strength that occurs when the tag's resonant frequency is reached. This alternating mode of operation is necessary to obtain a reading relative to each coil, which is accomplished simultaneously in the loading approach discussed above (since both coils are actively transmitting).

Although the present invention has been described with reference to specific details, it is not intended that such details should be regarded as limitations upon the scope of the invention, except as and to the extent that they are included in the accompanying claims.

What is claimed is:

1. A method of tracking a structure capable of magnetic coupling, the method comprising the steps of:
    a. providing at least one pair of coils oriented such that, when the at least one pair of coils is energized, a substantially uniform magnetic field is created in a region between the at least one pair of coils, the structure being disposed in the region;
    b. energizing the at least one pair of coils to magnetically couple the structure;
    c. for each of the at least one pair of coils, obtaining a value for a signal parameter indicative of the coupling; and
    d. determining a position of the structure based on the obtained values.

2. The method of claim 1 wherein the parameter is loading and all coils are simultaneously energized.

3. The method of claim 1 wherein the coils are arranged in a Helmholtz configuration.

4. The method of claim 3 wherein one pair of coils is provided, the position of the structure being established along a single dimension.

5. The method of claim 3 wherein two pairs of coils are provided, each pair of coils being oriented orthogonally with respect to the other pair, the position of the structure being established along two dimensions.

6. The method of claim 3 wherein three pairs of coils are provided, each pair of coils being oriented orthogonally with respect to the other pairs, the position of the structure being established along three dimensions.

7. The method of claim 1 wherein the coils each have a radius, each pair of coils being spaced apart by a distance equal to the radius.

8. The method of claim 7 wherein a plurality of pairs of coils is provided, each pair of coils being oriented orthogonally with respect to another pair, orthogonal pairs of coils comprising crossed windings.

9. The method of claim 1 wherein the coils each have a diameter, each pair of coils being spaced apart by a distance equal to the diameter.

10. The method of claim 1 wherein the structure is an LC resonator having a resonant frequency, the coils being energized in repeated sweeps through a frequency band including the resonant frequency, the position being updated with each sweep.

11. The method of claim 10 wherein each coil in a pair produces a magnetic field oriented axially toward the other coil, the structure being magnetically coupled to each coil at the resonant frequency by an amount dependent on a distance from the coil, a position of the structure with respect to each coil being determined from the amount of magnetic coupling to each coil.

12. The method of claim 11 wherein the amount of magnetic coupling is determined, for each coil, by a loading measurement.

13. The method of claim 10 wherein the LC resonator is capable of being worn on the hand, and further comprising the step of using the updated position to drive an entertainment device.

14. The method of claim 10 wherein the LC resonator is capable of being attached to a body part, and further comprising the step of using the updated position to steer a treatment beam to the body part notwithstanding movement thereof.

15. The method of claim 1 wherein the structure is an LC resonator having a resonant frequency, and further comprising the step of identifying the structure based on the resonant frequency.

16. The method of claim 1 wherein the structure exhibits mechanically coupled magnetic resonance.

17. The method of claim 1 wherein the structure comprises a plurality of non-aligned magnetic resonance elements, the structure thereby being capable of coupling to each of the at least one pair of coils regardless of orientation.

18. The method of claim 1 wherein at least two pairs of orthogonally oriented coils are provided, and further comprising the step of simultaneously energizing non-aligned coils to resolve ambiguity arising from alignment of the structure with one of the pairs of coils.

19. An apparatus for tracking a structure capable of magnetic coupling, the apparatus comprising:
    a. at least one pair of coils oriented such that, when the at least one pair of coils is energized, a substantially uniform magnetic field is created in a region between the at least one pair of coils, the region being sufficiently large to accommodate the structure;

b. an AC source for energizing the at least one pair of coils to magnetically couple the structure;

c. circuitry associated with each of the at least one pair of coils for obtaining a value for a signal parameter indicative of the coupling to each of the at least one pair of coils; and d. a processor for determining a position of the structure based on the obtained values.

20. The apparatus of claim 19 wherein the parameter is loading and the coils are simultaneously energized.

21. The apparatus of claim 19 wherein the coils are arranged in a Helmholtz configuration.

22. The apparatus of claim 21 comprising a single pair of coils, the processor establishing a position of the structure along a single dimension.

23. The apparatus of claim 21 comprising two pairs of coils, each pair of coils being oriented orthogonally with respect to the other pair, the processor establishing a position of the structure along two dimensions.

24. The apparatus of claim 21 comprising three pairs of coils, each pair of coils being oriented orthogonally with respect to the other pairs, the processor establishing a position of the structure along three dimensions.

25. The apparatus of claim 19 wherein the coils each have a radius, each pair of coils being spaced apart by a distance equal to the radius.

26. The apparatus of claim 25 comprising a plurality of pairs of coils, each pair of coils being oriented orthogonally with respect to another pair, orthogonal pairs of coils comprising crossed windings.

27. The apparatus of claim 19 wherein the coils each have a diameter, each pair of coils being spaced apart by a distance equal to the diameter.

28. The apparatus of claim 19 wherein the structure is an LC resonator having a resonant frequency, the coils being energized in repeated sweeps through a frequency band including the rsonant frequency, the position being updated with each sweep.

29. The apparatus of claim 28 wherein each coil in a pair produces a magnetic field oriented axially toward the other coil, the structure being magnetically coupled to each coil at the resonant frequency by an amount dependent on a distance from the coil, the processor determining a position of the structure with respect to each coil based on the amount of magnetic coupling to each coil.

30. The apparatus of claim 29 wherein the amount of magnetic coupling is determined, for each coil, by a loading measurement.

31. The apparatus of claim 19 wherein the structure is an LC resonator having a resonant frequency, the processor being configured to identify the structure based on the resonant frequency.

32. The apparatus of claim 19 wherein the structure exhibits mechanically coupled magnetic resonance.

33. The apparatus of claim 19 wherein the structure comprises a plurality of non-aligned magnetic resonance elements to thereby couple to each of the at least one pair of coils regardless of orientation.

34. The apparatus of claim 19 comprising at least two pairs of orthogonally oriented coils, the AC source being configured to simultaneously energize non-aligned coils to resolve ambiguity arising from alignment of the structure with one of the pairs of coils.

* * * * *